United States Patent
Imura et al.

[19]

[11] Patent Number: 5,881,325
[45] Date of Patent: *Mar. 9, 1999

[54] APPARATUS HAVING AN IMAGE VIBRATION REDUCTION OPTICAL SYSTEM WHICH IS GUIDED TO, AND LOCKED AT, AN ORIGIN POSITION BY A DRIVING MEMBER

[75] Inventors: Yoshio Imura; Tadao Kai, both of Kawasaki; Shinichi Hirano, Utsunomiya; Tetsuo In, Yokohama, all of Japan

[73] Assignee: Nikon Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 715,379
[22] Filed: Sep. 12, 1996

[30] Foreign Application Priority Data

Sep. 13, 1995 [JP] Japan .................................. 7-234942
Sep. 14, 1995 [JP] Japan .................................. 7-262580

[51] Int. Cl.⁶ ............................................. G03B 5/00
[52] U.S. Cl. .............................................. 396/55; 348/208
[58] Field of Search ............................. 396/52, 53, 54, 396/55; 348/208

[56] References Cited

U.S. PATENT DOCUMENTS

5,153,633  10/1992  Otani .................................. 396/55

*Primary Examiner*—David M. Gray
*Assistant Examiner*—J. K. Han

[57] ABSTRACT

An apparatus which includes an optical system and a driving member. The optical system is shiftable from an origin position coinciding with an optical axis of the apparatus, to reduce image vibration affecting the apparatus. The driving member is movable from a first position to a second position. When the driving member is in the first position, the optical system is unlocked and is therefore shiftable to reduce image vibration. When the driving member moves from the first position to the second position and the optical system is not at the origin position, the driving member guides the optical system to, and then locks the optical system at, the origin position.

15 Claims, 7 Drawing Sheets

APPARATUS HAVING AN IMAGE VIBRATION REDUCTION OPTICAL SYSTEM WHICH IS GUIDED TO, AND LOCKED AT, AN ORIGIN POSITION BY A DRIVING MEMBER

BACKGROUND OF THE INVENTION

1. Field of the Invention

This invention relates to an image vibration reduction apparatus best suited as a hard vibration reduction apparatus for a camera.

2. Related Background Art

In an image vibration reduction apparatus of this kind according to the prior art, a lock mechanism for locking an image vibration reduction optical system has not generally been used. Also, even an image vibration reduction apparatus having a lock mechanism, design has been made such that an image vibration reduction optical system is moved to the central portion and then is locked.

However, when the image vibration reduction optical system is to be protected from vibration, or when the image vibration reduction optical system is moved under the influence of noise or the like and causes image vibration, it is preferable to lock the image vibration reduction optical system. Further, as the lock mechanism, it is preferable that the image vibration reduction optical system need not be moved to the central portion and can be locked at whatever position it may be.

There is known a vibration reduction apparatus in which vibration created in a camera, a video camera or the like is detected by an angle-velocity sensor or the like and a vibration reduction optical system which is a portion of a photo-taking optical system is moved in a direction opposite to the direction of the detected vibration and the optical axis thereof is varied to thereby reduce image vibration. To effect such vibration reduction, it is necessary to know the fiducial position (origin) of the vibration reduction optical system. This fiducial position is memorized in advance in a memory portion such as a ROM.

However, the aforedescribed vibration reduction apparatus according to the prior art has suffered from the following problems.

In the setting of the fiducial position of the vibration reduction optical system, the characteristic of a position detecting sensor is varied by environment (such as temperature and humidity), and this has led to the problem that when vibration reduction is effected on the basis of the preset fiducial position, an error occurs.

To solve this problem, there is known a method of actually mounting a temperature detection circuit or the like in the apparatus and changing the fiducial position in conformity with temperature. In this method, however, a discrete circuit such as the temperature detection circuit becomes necessary, and this leads to the problem that the apparatus becomes bulky and costly.

There is also the problem that if the fiducial position of the vibration reduction optical system cannot be detected accurately, highly accurate vibration reduction cannot be effected.

SUMMARY OF THE INVENTION

It is an object of the present invention to provide a lock mechanism capable of locking an image vibration reduction optical system irrespective of the position thereof.

It is also an object of the present invention to provide an image vibration reduction apparatus for accurately detecting the position of a vibration reduction optical system by simple method and effecting highly accurate vibration reduction.

To achieve this object, the image vibration reduction apparatus of the present invention is provided with an image vibration reduction optical system driven to reduce image vibration, a first plumbing member provided in the image vibration reduction optical system, reduction optical system driving means for driving the image vibration reduction optical system, a second plumbing member provided in the reduction optical system driving means, and plumbing member driving means for driving the second plumbing member and bringing it into engagement with the first plumbing member, and is designed such that the plumbing member driving means drives the second plumbing member and brings it into engagement with the first plumbing member to thereby fix the position of the image vibration reduction optical system.

The present invention is provided with a power source unit for supplying electric power, a vibration reduction mechanism unit for moving a vibration reduction optical system to reduce image vibration, a position detecting unit for detecting the position of the vibration reduction optical system, and a memory unit for memorizing the fiducial position of the vibration reduction optical system, and is characterized in that after electric power is supplied by the power source unit, the fiducial position of the vibration reduction optical system is detected by the position detecting unit, and the result of the detection is memorized in the memory unit.

The present invention is further provided with a fixing unit for fixing the vibration reduction optical system at a predetermined position, and a fixed state detecting unit for detecting that the fixing unit fixes the vibration reduction optical system, and is characterized in that when the fixed state detecting unit detects the fixed state of the vibration reduction optical system after the electrical power by the power source unit is supplied, the fiducial position of the vibration reduction optical system is detected by the position detecting unit and the result of the detection is memorized in the memory unit.

The present invention is further characterized in that when the position of the vibration reduction optical system detected by the position detecting unit is outside a range within which the vibration reduction optical system can be fixed by the fixing unit, the vibration reduction optical system is moved to within the range within which it can be fixed by the fixing unit.

The present invention is further characterized in that after the lapse of a predetermined time after the electric power is supplied by the power source unit, the fiducial position of the vibration reduction optical system is detected by the position detecting unit and the result of the detection is memorized in the memory unit.

DESCRIPTION OF THE PREFERRED EMBODIMENTS

Some embodiments of the present invention will hereinafter be described with reference to the drawings.

Figure 1:
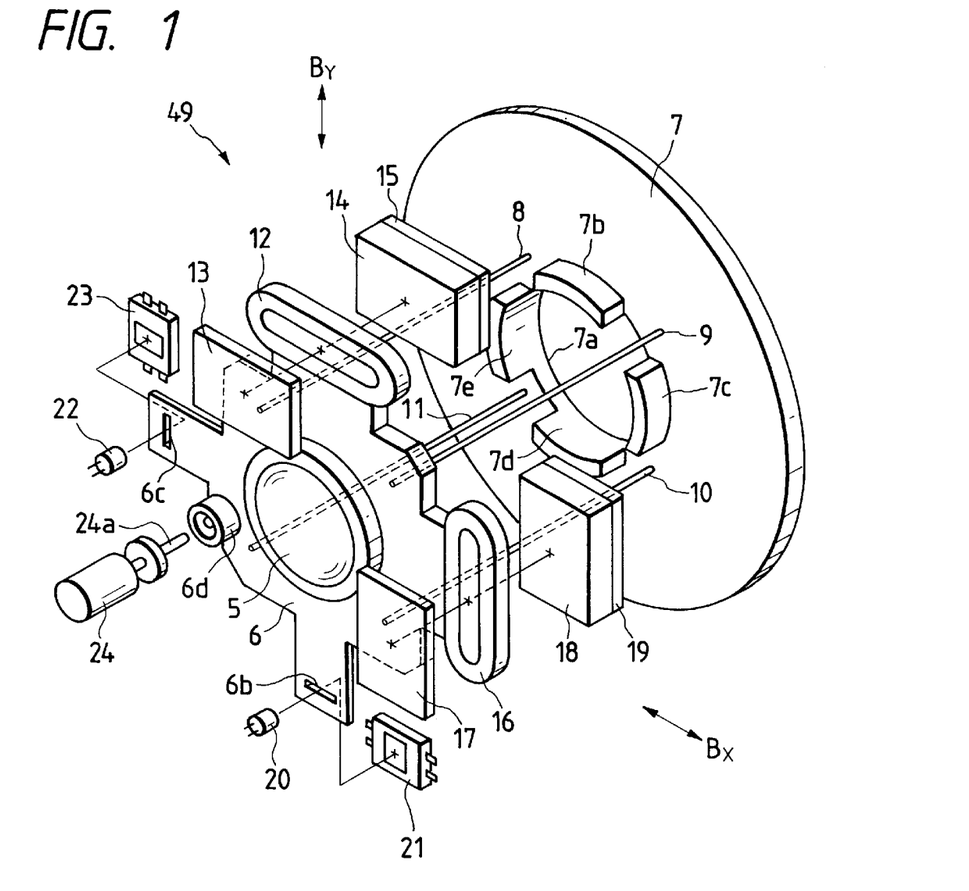
FIG. 1 is a perspective view showing an embodiment of an image vibration reduction apparatus according to the present invention.

FIG. 1 is a perspective view showing an embodiment of an image vibration reduction apparatus according to the present invention. FIG. 1 shows a driving mechanism for parallel-moving an image vibration reduction lens 5.

FIG. 1 is a perspective view showing the driving mechanism for moving the image vibration reduction lens 5.

The image vibration reduction lens 5 is fixed to a lens frame 6. Support members 8, 9, 10 and 11 are wire-like members formed of a material such as a spring, and are for resiliently supporting the image vibration reduction lens 5. One end of each of the support members 8 to 11 is fixed to the lens frame 6 and the other ends of the support members 8 to 11 are fixed to a base member 7.

Thus, the lens frame 6 is substantially parallel-movable in both of $B_X$ direction and $B_Y$ direction relative to the base member 7.

A vertical direction voice coil motor 40 is comprised of a coil 12, a yoke 13, a permanent magnet 14 and a yoke 15. The coil 12 is fixed to the lens frame 6. The permanent magnet 14 and the yoke 15 are fixed, and the yoke 13 and the permanent magnet 14 are disposed in opposed relationship with each other with the coil 12 interposed therebetween. When an electric current flows to the coil 12, the image vibration reduction lens 5 receives a force in $B_Y$ direction and is driven thereby.

Likewise, a horizontal direction voice coil motor 41 is comprised of a coil 16, a yoke 17, a permanent magnet 18 and a yoke 19. The coil 16 is fixed to the lens frame 6. The permanent magnet 18 and the yoke 19 are fixed, and the yoke 17 and the permanent magnet 18 are disposed in opposed relationship with each other with the coil 16 interposed therebetween. When an electric current flows to the coil 16, the image vibration reduction lens 5 receives a force in $B_X$ direction and is driven thereby.

A vertical direction position sensor 42 is comprised of a slit 6b, a light emitting element (LED) 20 and a light receiving element (PSD) 21. The slit 6b is formed in the lens frame 6, and the light emitting element 20 and the light receiving element 21 are disposed in opposed relationship with each other with the slit 6b interposed therebetween. Light emitted from the light emitting element 20 passes through the slit 6b and arrives at the light receiving element 21. Accordingly, the position of the light arriving at the light receiving element 21 is moved by the movement of the image vibration reduction lens 5, and the output signal of the light receiving element 21 varies. The position of the image vibration reduction lens 5 in $B_Y$ direction can be detected by this signal.

Likewise, a horizontal direction position sensor 43 is comprised of a slit 6c, a light emitting element (LED) 22 and a light receiving element (PSD) 23. The slit 6c is formed in the lens frame 6, and the light emitting element 22 and the light receiving element 23 are disposed in opposed relationship with each other with the slit 6c interposed therebetween. Light emitted from the light emitting element 22 passes through the slit 6c and arrives at the light receiving element 23. Accordingly, the position of the light arriving at the light receiving element 23 is moved by the movement of the image vibration reduction lens 5 and the output signal of the light receiving element 23 varies. The position of the image vibration reduction lens 5 in $B_X$ direction can be detected by this signal.

Figure 3:
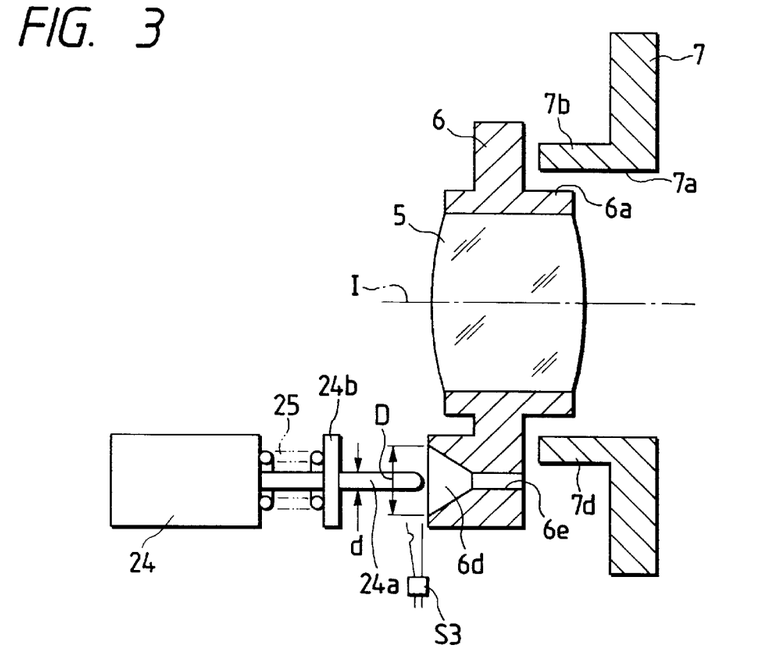
FIG. 3 is a cross-sectional view showing a first embodiment of the image vibration reduction apparatus according to the present invention.
Figure 4:
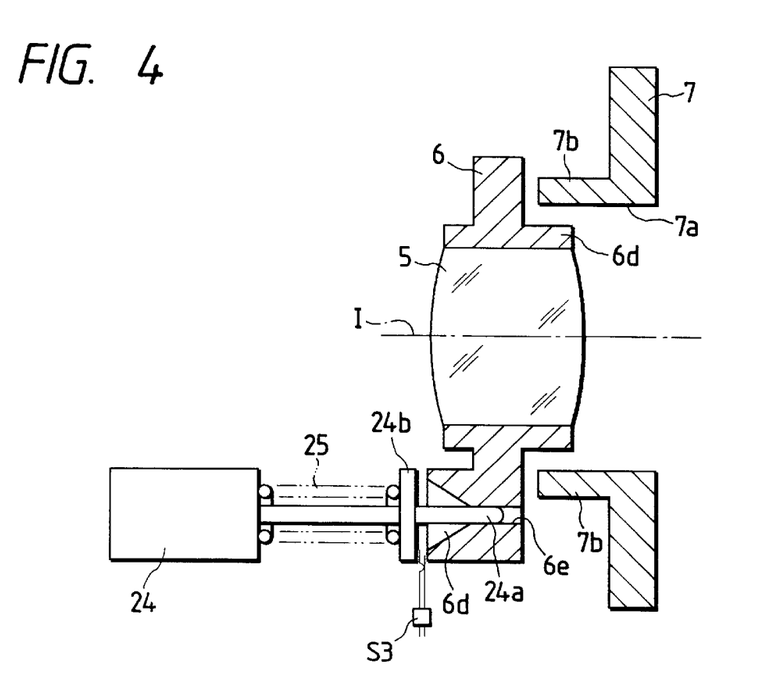
FIG. 4 is a cross-sectional view showing the first embodiment of the image vibration reduction apparatus according to the present invention.
Figure 5:
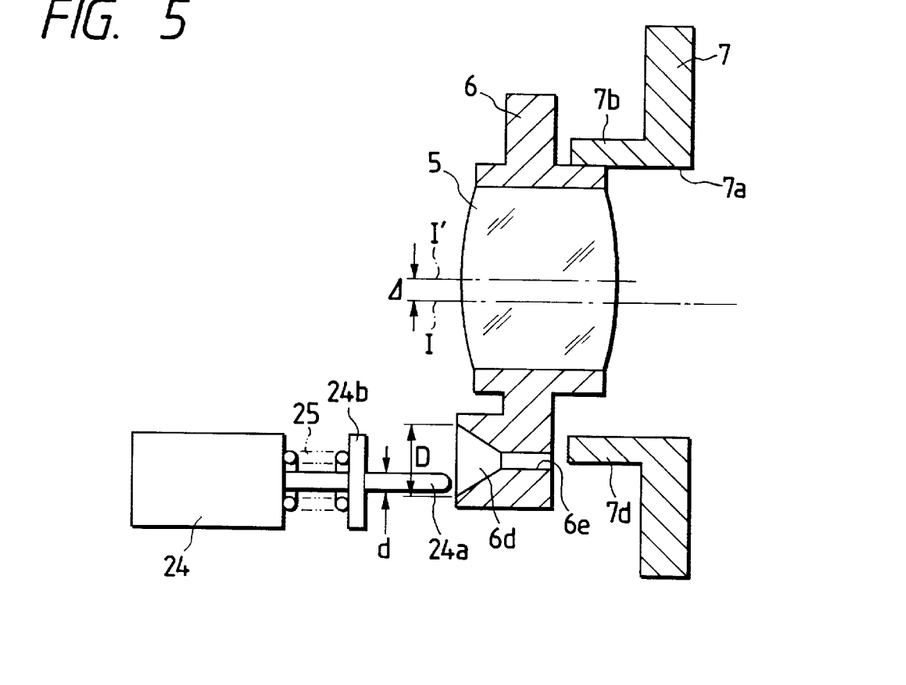
FIG. 5 is a cross-sectional view showing the first embodiment of the image vibration reduction apparatus according to the present invention.

There are four wall portions 7b, 7c, 7d and 7e around the central opening portion 7a of the base member 7, and the lens frame 6 is disposed inside these four wall portions 7b, 7c, 7d and 7e (see FIGS. 3 to 5). Accordingly, the amount of movement of the image vibration reduction lens 5 may be mechanically limited by these four wall portions 7b, 7c, 7d and 7e.

Figure 2:
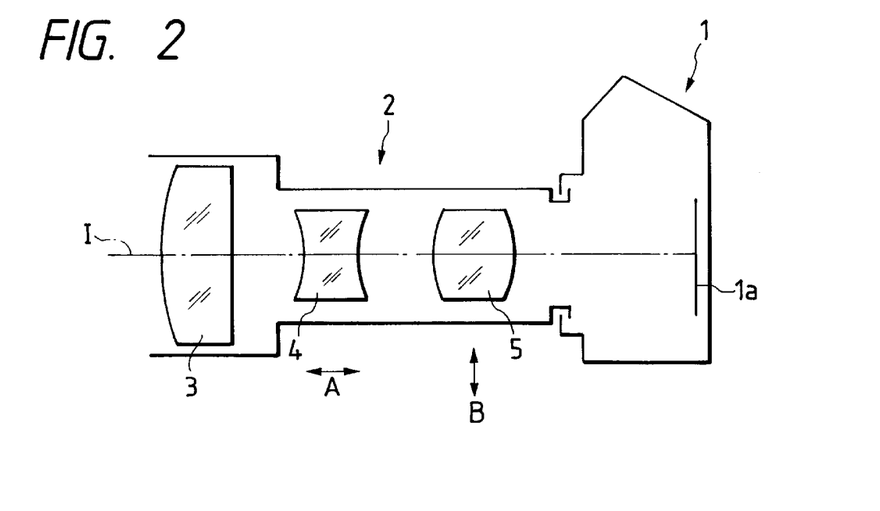
FIG. 2 is a cross-sectional view showing an embodiment of the image vibration reduction apparatus according to the present invention.

An example of the incorporation of this mechanism is shown in the cross-sectional view of the camera of FIG. 2. In FIG. 2, a lens 2 is mounted on the camera 1. The lens 2 comprises a first lens unit 3, a second lens unit 4 and a third lens unit 5. The second lens unit 4 is moved in the direction of arrow A which is the same direction as an optical axis I to thereby effect focus adjustment to form the image of an object on an image plane 1a. The third lens unit 5 is driven in the direction of arrow B which is a direction perpendicular to the optical axis I and a direction perpendicular to the plane of the drawing sheet of FIG. 2 to t hereby reduce image vibration.

Turning back to FIG. 1, the recess 6d of the lens frame 6 and a latch solenoid 24 opposed thereto are disposed to lock the image vibration reduction lens 5. The plunger 24a of the latch solenoid 24 is inserted into the recess 6d of the lens frame 6 to thereby lock the image vibration reduction lens 5. The structure of this lock will hereinafter be described in detail with reference to the cross-sectional views of FIGS. 3 and 4.

In FIG. 3, the recess 6d of the lens frame 6 is an aperture presenting a conical shape and a cylindrical shape. The latch solenoid 24 is on that side which presents the conical shape. The plunger 24a of the latch solenoid 24 is biased rightwardly as viewed in FIG. 3 by a spring 25 disposed between a flange portion 24b and the body portion of the latch solenoid 24. The state of the latch solenoid 24 shown in FIG. 3 is a state in which the plunger 24a has been latched by a permanent magnet in the latch solenoid 24. In this state, the plunger 24a and the recess 6d of the lens frame 6 are not coupled together and therefore, the image vibration reduction lens 5 is free and image vibration reduction is effected. By an electric current being flowed to the latch solenoid 24 from this state, the magnetic force of the permanent magnet is negated and the plunger 24a is moved by the biasing force of the spring 25.

The result of this is shown in the cross-sectional view of FIG. 4. The plunger 24a reaches an aperture portion 6e presenting a cylindrical shape in the recess 6d of the lens frame 6. Accordingly, the image vibration reduction lens 5 is locked. Also, the flange portion 24b closes a switch S3. Thereby the image vibration reduction lens 5 is fixed, and the switch S3 detects that the image vibration reduction lens 5 has been fixed.

The size of the recess 6d of the lens frame 6 will now be described with reference to the cross-sectional view of FIG. 5. FIG. 5 shows a state in which the image vibration reduction lens 5 has been moved upwardly as viewed in FIG. 5 until the lens frame 6 bears against the wall portion 7b of the base member 7. In other words, the image vibration reduction lens 5 is in a state in which the movement thereof is mechanically limited. Even in such a state, the plunger 24a is inside the diameter D of the opening portion of the recess 6d of the lens frame which presents a conical shape. Accordingly, if even from such a state an electric current is flowed to the latch solenoid 24, the tip end of the plunger 24a presses down the conical inclined surface of the recess 6d by the biasing force of the spring 25, whereby the image vibration reduction lens 5 can be locked in the state shown in FIG. 4.

If design is made such that when the diameter of the opening portion of the recess 6d is defined as D and the amount of movement of the image vibration reduction lens 5 from the center position thereof (the position at which the optical axis I and the optical axis I' of the image vibration reduction lens 5 coincide with each other) to the limit position is defined as $\Delta$ and the diameter of the plunger 24a is defined as d, the relation that $$(D-d)/2 > \Delta$$

is kept, the image vibration reduction lens 5 can be locked at whatever position it may be. Further, it is not necessary to drive the image vibration reduction lens 5 by the voice coil motor (the coil 12, the yoke 13, the permanent magnet 14 and the yoke 15) in order to lock the image vibration reduction lens 5.

Figure 6:
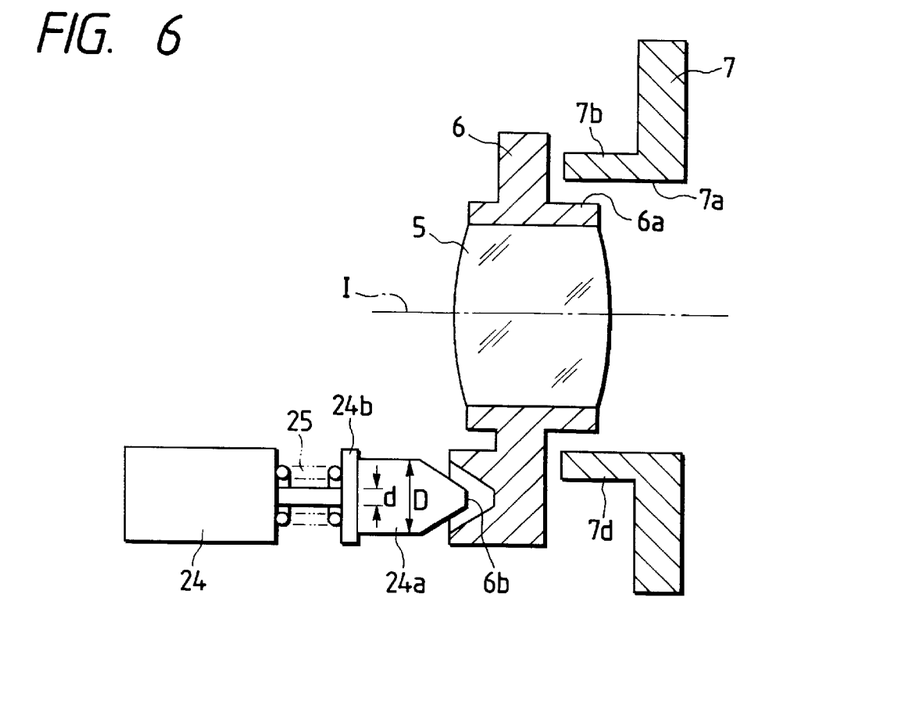
FIG. 6 is a cross-sectional view showing a second embodiment of the image vibration reduction apparatus according to the present invention.

FIG. 6 shows a second embodiment in which the shape of the plunger 24a is modified. That is, this embodiment is one in which the shape of the plunger 24a is made into a convex cone and the plunger is fitted to a conical recess 6d. In this second embodiment, the aperture portion 6e can be eliminated. The same constituent portions as those in FIGS. 3 to 5 are given the same reference numerals and need not be described.

Figure 7:
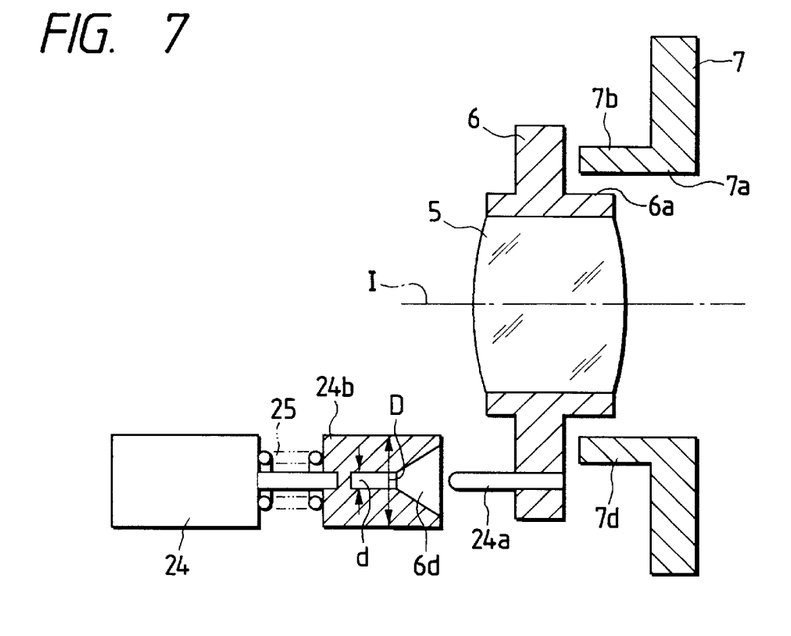
FIG. 7 is a cross-sectional view showing a third embodiment of the image vibration reduction apparatus according to the present invention.

FIG. 7 shows a third embodiment in which the mounted positions of the plunger (bar-like member) 24a and the recess 6d are made opposite. That is, the plunger (bar-like member) 24a is fixed to the lens frame 6. Also, the recess 6d is mounted on the latch solenoid 24. In this third embodiment, the plunger (bar-like member) 24a can be fixed to the lens frame 6 to thereby achieve the lighter weight of the lens frame 6 which is a movable member. The same constituent portions as those in FIGS. 3 to 5 are given the same reference numerals and need not be described.

Figure 8:
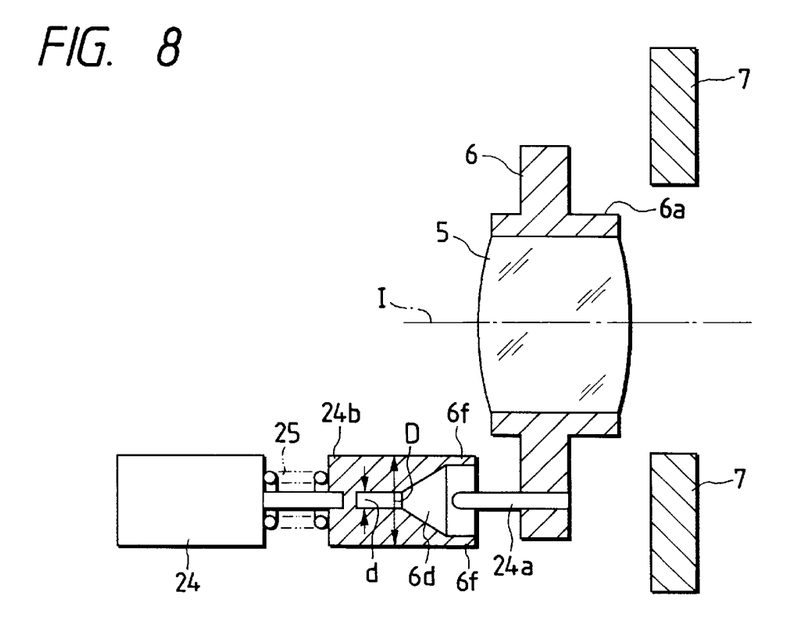
FIG. 8 is a cross-sectional view showing a fourth embodiment of the image vibration reduction apparatus according to the present invention.

FIG. 8 shows a fourth embodiment which is a modification of the third embodiment. That is, in the fourth embodiment, the wall portions 7b, 7c, 7d and 7e in the third embodiment are eliminated and a cylindrical portion 6f is provided on the tip end (the right side as viewed in FIG. 8) of the recess 6d. The plunger 24a bears against the cylindrical portion 6f so as to regulate the range of movement of the lens frame 6, and the wall portions 7b, 7c, 7d and 7e are eliminated. The same constituent portions as those in FIGS. 3 to 5 are given the same reference numerals and need not be described.

As described above, according to the image vibration reduction apparatus of the present invention, plumbing member driving means drives the second plumbing member and brings it into engagement with the first plumbing member to thereby fix the position of the image vibration reduction optical system and therefore, the plumbing range by the plumbing member is made larger than the drive range of the image vibration reduction optical system, whereby it becomes possible to lock the image vibration reduction optical system reliably irrespective of the position of the image vibration reduction optical system.

Figure 9:
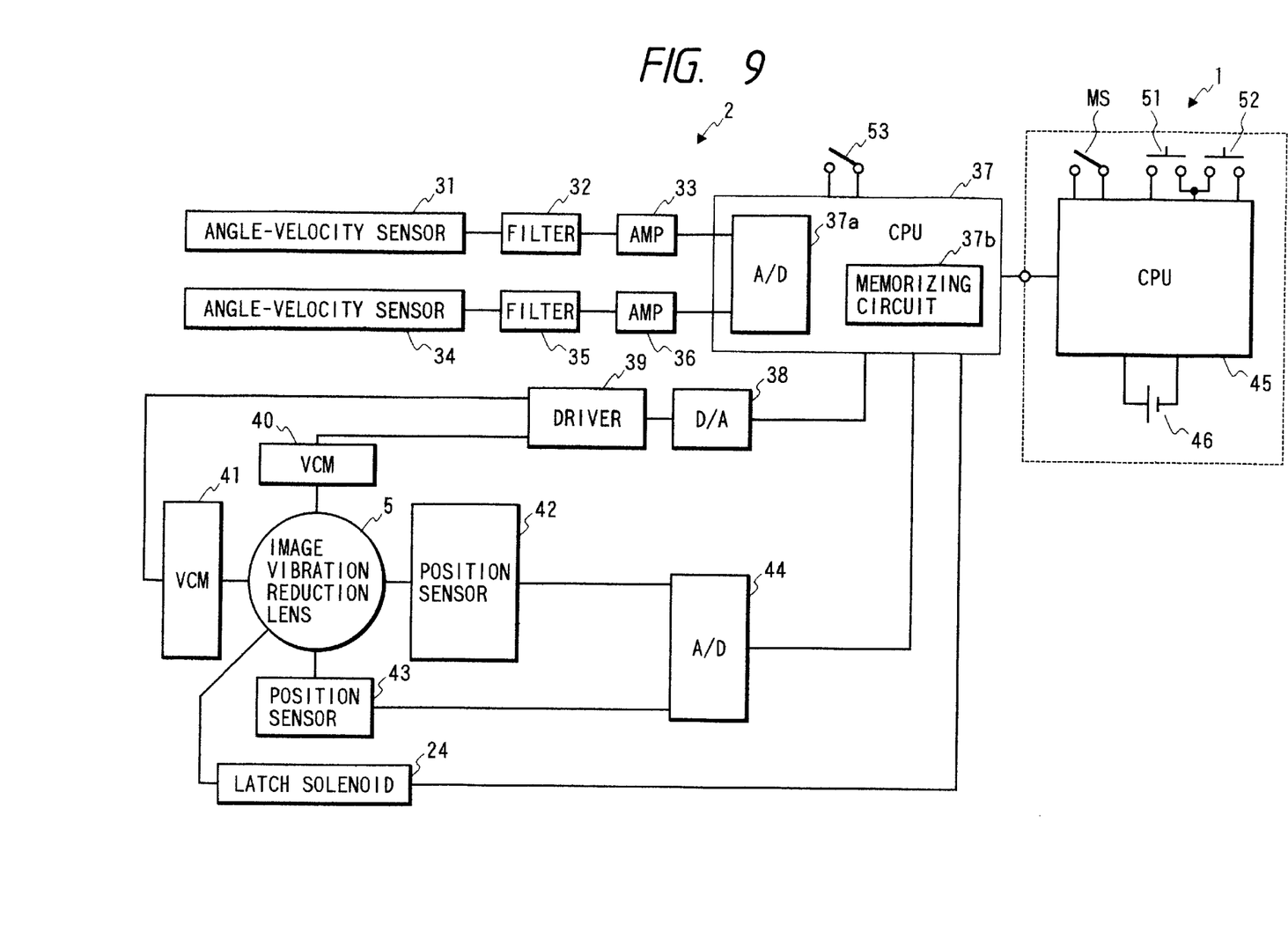
FIG. 9 is a block diagram showing another embodiment of the vibration reduction apparatus according to the present invention.

Another embodiment of the present invention will hereinafter be described with reference to the drawings. FIG. 9 is a block diagram showing an embodiment of the vibration reduction apparatus according to the present invention.

Angle-velocity sensors 31 and 34 detect the vibrations of the camera 1 and the lens 2, respectively. The outputs of the angle-velocity sensors 31 and 34 pass through filters 32 and 35, respectively, are amplified by amplifiers 33 and 36, respectively, and are inputted to a CPU 37. These outputs are A/D-converted by the A/D converter 37a of the CPU 37.

The CPU 37 effects predetermined processing to the inputted signals, and output a control signal to a D/A converter 38 to effect image vibration reduction.

A driver 39 drives the image vibration reduction lens 5 by voice coil motors (VCMs) 40 and 41 to reduce image vibration on the basis of a signal D/A-converted by the D/A converter 38.

Position sensors 42 and 43 detect the position of the driven image vibration reduction lens 5. These detection signals are A/D-converted by an A/D converter 44 and are fed back to the CPU 37.

The latch solenoid 24 is for fixing the image vibration reduction lens 5 at a predetermined position.

The switch S3 is a switch for detecting that the latch solenoid 24 operates and the image vibration reduction lens 5 is fixed.

A memorizing circuit 37b in the CPU 37 is a circuit for memorizing the position of the image vibration reduction lens 5 detected by the position sensors 42 and 43.

On the camera 1 side, there are provided a CPU 45 governing various kinds of control, a power supply battery 46, a main switch (power source switch) MS, a half-depression switch S1 adapted to be closed by the half depression of a release button, and a full depression switch S2 adapted to be closed by the full depression of the release button. The construction of the present embodiment is substantially the same as that of the above-described embodiment (FIGS. 2 to 4) and therefore need not be described.

Figure 10:
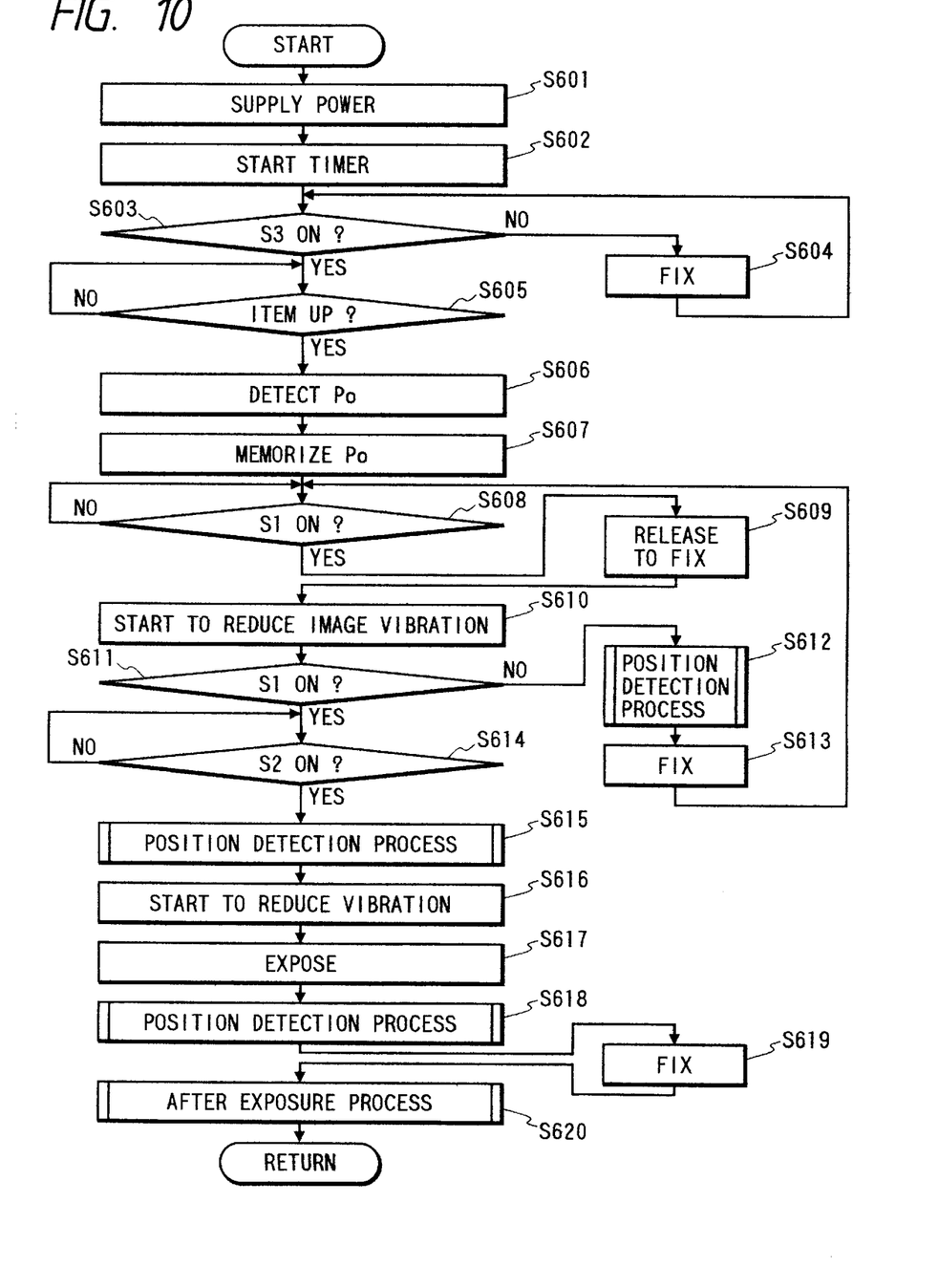
FIG. 10 is a flow chart showing the processing carried out by CPUs 37 and 45.

FIG. 10 is a flow chart showing the processing effected by the CPUs 37 and 45. When the main switch MS is closed, this flow starts.

Figure 12:
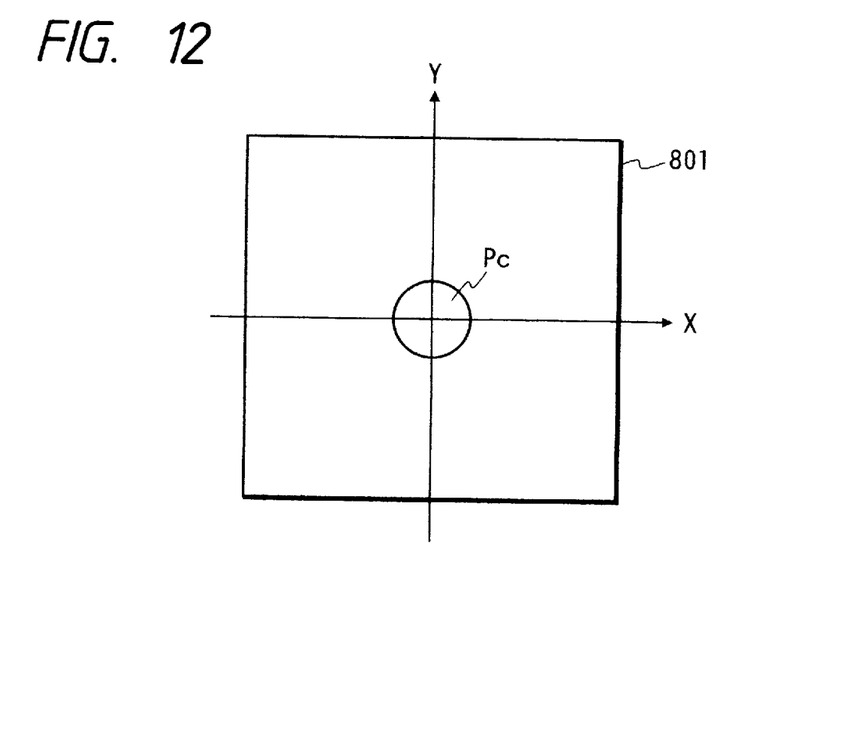
FIG. 12 shows the relation between the limitation range 801 and the position range Pc of an image vibration reduction lens 5.

First, at S601, the CPU 45 supplies the electric power of the power supply battery 46 to the CPU 37. At S602, the CPU 45 starts a timer (not shown). At the next step S603, whether the switch S3 is closed is judged. If the switch S3 is closed, the image vibration reduction lens 5 is fixed and therefore advance is made to S605, and if the switch S3 is not closed, the image vibration reduction lens 5 is not fixed and therefore advance is made to S604. At S604, the latch solenoid 24 is driven to thereby fix the image vibration reduction lens 5, and return is made to S603. Here, as is apparent from FIG. 5, when the image vibration reduction lens 5 is fixed, the optical axis thereof lies at the position of the center coincident with the optical axis I of the other lens units 3 and 4 and is fixed at the position of the center of a limitation range 801 (FIG. 12).

At S605, whether the timer started at S602 has been time up is judged. If it is not time up, the program waits until the timer is time up. If the timer has been time up, advance is made to S606. The timer time here is, for example, the time until the supply state of the electric power of the power supply battery 46 becomes stable.

At S606, the position sensors 42 and 43 detect the two-dimensional coordinates of the image vibration reduction lens 5. At the next step S607, the coordinates position P0 of the image vibration reduction lens 5 is memorized in the memorizing circuit 37b.

It is by the following reason that when the electric power is thus supplied, the position of the image vibration reduction lens 5 is detected. When the ambient temperature or the power source voltage value changes, the outputs of the position detecting sensors 42 and 43 also change. Accordingly, due to the environmental change, it becomes difficult to detect the position of the image vibration reduction lens 5 accurately. In order to solve this, in the present invention, the image vibration reduction lens 5 is fixed at the position of the center and the outputs of the light receiving elements 21 and 23 at this position are memorized as the position of the center of the image vibration reduction lens 5. This value is set to the fiducial value of the following image vibration reduction and is controlled. Thereby, the position of the image vibration reduction lens 5 can be accurately detected without being affected by any change in the ambient temperature or the power source voltage value and with the influence of the errors of the mounted positions of the slits 6b, 6c and the light receiving elements 21, 23 being eliminated. That is, image vibration reduction can be effected accurately.

At S608, whether the switch S1 has been closed (whether the release button has been half-depressed) is judged. The program waits until the switch S1 is closed, and when it is closed, at S609, the latch solenoid 24 is electrically energized and the fixing of the image vibration reduction lens 5 is released. At the next step S610, image vibration reduction is started on the basis of the center position P0 of the image vibration reduction lens 5 memorized at S607.

At S611, whether the switch S1 is still closed is judged. When it is not closed, advance is made to S612, where a position detection process is carried out.

Figure 11:
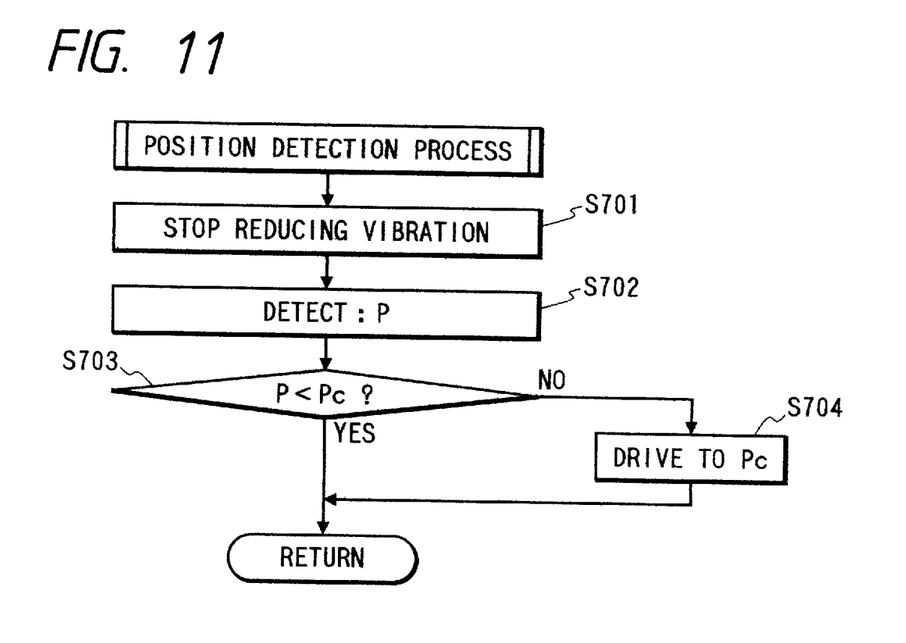
FIG. 11 is a flow chart showing the position detecting process at S612.

FIG. 11 is a flow chart showing the position detection process at S612. At S701, image vibration reduction is stopped and the image vibration reduction lens 5 is held at that position by the voice coil motors 40 and 41. At S702, the position P of the image vibration reduction lens 5 at this time is detected. At the next step S703, whether this position P is within a predetermined position range Pc is judged. If it is within the position range Pc, return is made to the flow of FIG. 10, and if it is not within the position range Pc, advance is made to S704, where the image vibration reduction lens 5 is driven until it comes into the position range Pc. Here, the position range Pc refers to the position range of the image vibration reduction lens 5 within which the plunger 24a of the latch solenoid 24 can be fitted in the fitting portion 6d. That is, in order to enable the plunger 24a of the latch solenoid 24 to be inserted into the aperture of the fitting portion 6d when it has been moved toward the fitting portion 6d side, the image vibration reduction lens 5 is moved to a predetermined position. Return is then made to the flow of FIG. 10.

At S613, the latch solenoid 24 is driven to thereby fix the image vibration reduction lens 5, and return is made to S608.

On the other hand, when at S611, the switch S1 is closed, advance is made to S614, where whether the switch S2 has been closed (whether the release button has been fully depressed) is judged. If the switch S2 is not closed, the program waits until it is closed, and if it is closed, advance is made to S615. At S615, the above-described position detection process (S701-S704) is carried out. At the next S616, image vibration reduction is started on the basis of the center position P0 of the image vibration reduction lens 5 memorized at S607. When image vibration reduction is to be started, the image vibration reduction lens 5 is already within the position range Pc and therefore, image vibration reduction control can be started quickly.

At S617, exposure is started, and at S618, the above-described position detection process (S701-S704) is carried out after the completion of the exposure. At S619, the image vibration reduction lens 5 is fixed, and at the next step S620, after exposure process such as the winding of film is carried out.

The above embodiments have been described with respect to a case where the main switch MS of the camera 1 becomes closed to start the operation, but alternatively, design may be made such that when there is provided the function of switching off the power source by a timer for the purpose of power saving when the main switch MS is left closed, a similar process is started by the switch S1 being closed (from the aforedescribed S601) by the half depression of the release button.

Also, as the light receiving elements 21 and 23 of the position sensors 42 and 43, use can be made of, besides PSDs, for example, SPDs, electrostatic pickups, resistors or magnetic sensors to obtain a similar effect.

According to the present invention, design is made such that after electric power is supplied, the position of the vibration reduction optical system is detected and that position is memorized as the fiducial position and therefore, the influence of any change in temperature and the influence of the error of the mounted position of the position detecting unit can be eliminated and the fiducial position of the vibration reduction optical system can be detected accurately. Thus, highly accurate vibration reduction control can be accomplished.

According to the present invention, design is made such that the fiducial position of the vibration reduction optical system is detected with the vibration reduction optical system fixed by the fixing unit and therefore, the fiducial position of the vibration reduction optical system can be detected more accurately.

According to the present invention, the fiducial position of the vibration reduction optical system can be accurately detected without being affected by any change in the power source voltage value or the like.

According to the present invention, design is made such that the vibration reduction optical system is returned to a predetermined position even after vibration reduction control and therefore, the vibration reduction optical system becomes capable of being accurately fixed by the fixing unit. Also, the starting of the next vibration reduction control can be effected quickly.

What is claimed is:

1. An apparatus comprising:
   an image vibration reduction optical system which is shiftable within a range from an origin position, to reduce image vibration affecting the apparatus;
   a support member movable with said image vibration reduction optical system while supporting said image vibration reduction optical system; and a driving member having a guide device for guiding said support member, and movable between a driving position and a non-driving position, wherein,
   in response to the movement of said driving member from the non-driving position to the driving position, said support member is guided by said guide device so that the image vibration reduction optical system is guided to, and then locked at, the origin position, said guide device comprises
     a bar-like member formed on said driving member, and
     a conical recess formed in said support member,
   when said driving member moves from the non-driving position to the driving position, said driving member brings said bar-like member into said conical recess, and centers said bar-like member relative to said conical recess by the utilization of a reaction force occurring when said bar-like member bears against an inner wall of said conical recess, thereby causing said image vibration reduction optical system to be guided to the origin position, and
   said conical recess has a bottom with a hole formed therein, and when said image vibration reduction optical system has arrived at said origin position, said bar-like member fits into said hole, to thereby lock said image vibration reduction optical system at the origin position.

2. The apparatus of claim 1, further comprising:
a limiting member for limiting the spacing of said bar-like member apart from said conical recess
and wherein by the limitation of said limiting member, said bar-like member comes into said conical recess in response to the movement of said driving member from the non-driving position to the driving position.

3. The apparatus of claim 1, wherein the origin position of said image vibration reduction optical system is the center of a range within which said image vibration reduction optical system is moved for vibration reduction.

4. The apparatus of claim 1, wherein the apparatus has an optical axis, and the origin position coincides with the optical axis.

5. An apparatus comprising:
an image vibration reduction optical system which is shiftable within a range from an origin position, to reduce image vibration affecting the apparatus;
a support member movable with said image vibration reduction optical system while supporting said image vibration reduction optical system; and
a driving member having a guide device for guiding said support member, and movable between a driving position and a non-driving position, wherein.
   in response to the movement of said driving member from the non-driving position to the driving position, said support member is guided by said guide device so that the image vibration reduction optical system is guided to, and then locked at, the origin position, said guide device comprises
     a conical recess formed in said driving member, and
     a bar-like member formed on said support member
   when said driving member moves from the non-driving position to the driving position, said driving member brings said bar-like member into said conical recess, and centers said bar-like member relative to said conical recess by the utilization of a reaction force occurring when said bar-like member bears against an inner wall of said conical recess, thereby causing said image vibration reduction optical system to be guided to the origin position, and
   said conical recess has a bottom with a hole formed therein, and when said image vibration reduction optical system has arrived at said origin position, said bar-like member fits into said hole, to thereby lock said image vibration reduction optical system at the origin position.

6. The apparatus of claim 5, further comprising:
an annular inner wall portion surrounding said bar-like member, wherein said bar-like member has its movement beyond said annular inner wall portion limited by said annular inner wall portion, whereby in response to the movement of said driving member from the non-driving position to the driving position, said bar-like member comes into said conical recess.

7. An apparatus comprising:
an optical system which is shiftable from an origin position coinciding with an optical axis, to reduce image vibration affecting the apparatus; and
a driving member which is movable from a first position to a second position, wherein,
   when the driving member is in the first position, the optical system is unlocked and is therefore shiftable to reduce image vibration,
   when the driving member moves from the first position to the second position and the optical system is not at the origin position, the driving member guides the optical system to, and then locks the optical system at, the origin position,
   the apparatus further comprises a support member which supports the optical system,
   the driving member comprises
     a bar-like member, and
     a conical recess formed in the support member,
   when the driving member moves from the first position to the second position, the driving member brings the bar-like member into the conical recess and centers the bar-like member relative to the conical recess by a reaction force occurring when the bar-like member bears against an inner wall of the conical recess, thereby causing the optical system to be guided to the origin position,
   the conical recess has a bottom with a hole formed therein, and,
   when the movement of the driving member from the first position to the second position causes the optical system to arrive at the origin position, the bar-like member fits into the hole, to thereby lock the optical system at the origin position.

8. The apparatus of claim 7, further comprising:
a limiting member for limiting the spacing of the bar-like member apart from the conical recess, wherein, by the limitation of the limiting member, the bar-like member comes into the conical recess in response to the movement of the driving member from the first position to the second position.

9. An apparatus comprising:
an optical system which is shiftable from an origin position coinciding with an optical axis, to reduce image vibration affecting the apparatus, and
a driving member which is movable from a first position to a second position, wherein,
   when the driving member is in the first position, the optical system is unlocked and is therefore shiftable to reduce image vibration, when the driving member moves from the first position to the second position and the optical system is not at the origin position, the driving member guides the optical system to, and then locks the optical system at, the origin position, the apparatus further comprises a support member which supports the optical system, the driving member comprises a conical recess formed in the driving member, and a bar-like member formed on the support member, when the driving member moves from the first position to the second position, the driving member brings the bar-like member into the conical recess and centers the bar-like member relative to the conical recess by a reaction force occurring when the bar-like member bears against an inner wall of the conical recess, thereby causing the optical system to be guided to the origin position, and the conical recess has a bottom with a hole formed therein, and when the driving member moves from the first position to the second position and the optical system has arrived at the origin position, the bar-like member fits into the hole, to thereby lock the optical system at the origin position.

10. The apparatus of claim 9, further comprising:

an annular inner wall portion surrounding the bar-like member, wherein the bar-like member has its movement beyond the annular inner wall portion limited by the annular inner wall portion, whereby in response to the movement of the driving member from the first position to the second position, the bar-like member comes into the conical recess.

11. The apparatus of claim 9, wherein the origin position of the optical system is the center of a range within which the optical system is moved for vibration reduction.

12. An apparatus comprising:

an optical system shiftable from an origin position to reduce image vibration affecting the apparatus;

a support member supporting the optical system and including a recess having a bottom with a lock hole formed therein; and a bar-like member, wherein one member of the group consisting of the support member and the bar-like member is movable from a first position to a second position, when said one member is in the first position, the optical system is unlocked and is therefore shiftable to reduce image vibration, and when said one member moves from the first position to the second position, the bar-like member is brought into the recess and is directed into the lock hole via a reaction force occurring when the bar-like member bears against an inner wall of the recess, thereby causing the optical system to be guided to, and locked at, the origin position.

13. The apparatus of claim 12, further comprising:

a limiting member limiting the spacing of the bar-like member apart from the recess.

14. An apparatus comprising:

an optical system shiftable from an origin position to reduce image vibration affecting the apparatus;

a support member supporting the optical system and including a bar-like member; and a locking mechanism including a recess having a bottom with a lock hole formed therein; wherein one member of the group consisting of the locking mechanism and the bar-like member is movable from a first position to a second position, when said one member is in the first position, the optical system is unlocked and is therefore shiftable to reduce image vibration, and when said one member moves from the first position to the second position, the bar-like member is brought into the recess and is directed into the lock hole via a reaction force occurring when the bar-like member bears against an inner wall of the recess, thereby causing the optical system to be guided to, and locked at, the origin position.

15. The apparatus of claim 14, further comprising:

a limiting member limiting the spacing of the bar-like member apart from the recess.

* * * * *